US009731494B2

(12) United States Patent
Yamasaki

(10) Patent No.: US 9,731,494 B2
(45) Date of Patent: Aug. 15, 2017

(54) METHOD OF DETERMINING A VALUE OF DENSITY OF A HEAT ABSORBING AGENT, METHOD OF FORMING A THREE-DIMENSIONAL OBJECT, APPARATUS FOR FORMING A THREE-DIMENSIONAL OBJECT, COMPUTER READABLE RECORDING MEDIUM STORING A PROGRAM FOR DETERMINING A VALUE OF DENSITY OF A HEAT ABSORBING AGENT, AND COMPUTER READABLE RECORDING MEDIUM STORING A PROGRAM FOR FORMING A THREE-DIMENSIONAL OBJECT

(71) Applicant: CASIO COMPUTER CO., LTD., Shibuya-ku, Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 64 days.

(21) Appl. No.: 14/728,475

(22) Filed: Jun. 2, 2015

(65) Prior Publication Data
US 2015/0375546 A1    Dec. 31, 2015

(30) Foreign Application Priority Data

Jun. 30, 2014    (JP) .................................. 2014-134972

(51) Int. Cl.
*B41J 2/205*        (2006.01)
*B33Y 50/00*      (2015.01)
(Continued)

(52) U.S. Cl.
CPC ............. *B33Y 50/00* (2014.12); *B41J 2/2054* (2013.01); *B41J 11/008* (2013.01); *B29C 67/0088* (2013.01); *B33Y 50/02* (2014.12)

(58) Field of Classification Search
CPC ....... B41J 29/00; B33Y 50/00; B29C 67/0088
(Continued)

(56) References Cited

U.S. PATENT DOCUMENTS

| 8,870,327 B2 | 10/2014 | Kanamura et al. |
| 2013/0161874 A1 | 6/2013 | Horiuchi et al. |
| 2014/0110887 A1* | 4/2014 | Horiuchi .................... B41J 3/28 264/413 |

FOREIGN PATENT DOCUMENTS

| JP | 54089638 A | 7/1979 |
| JP | 08118780 A | 5/1996 |

(Continued)

*Primary Examiner* — Mohammad Ali
*Assistant Examiner* — Sheela S Rao
(74) *Attorney, Agent, or Firm* — Holtz, Holtz & Volek PC

(57) ABSTRACT

A method of determining a value of density of a heat absorbing agent to be applied to a target pixel on a medium, wherein the medium is distended, when heated, the value of density of the heat absorbing agent is a density value of the heat absorbing agent that is applied to the medium before heated, and density values of the heat absorbing agent are set for plural pixels on the medium, the method comprising, calculating a first average density value of first plural pixels in the vicinity of the target pixel among the plural pixels, calculating a second average density value of second plural pixels in the vicinity of the target pixel, and determining a density value of the heat absorbing agent based on the calculated first average density value and second average density value, when a density value applied to the target pixel satisfies a first prescribed condition.

7 Claims, 13 Drawing Sheets

(51) Int. Cl.
*B41J 11/00* (2006.01)
*B29C 67/00* (2017.01)
*B33Y 50/02* (2015.01)

(58) Field of Classification Search
USPC .......................................................... 700/118
See application file for complete search history.

(56) References Cited

FOREIGN PATENT DOCUMENTS

| | | |
|---|---|---|
| JP | 2008149560 A | 7/2008 |
| JP | 2012171317 A | 9/2012 |
| JP | 2013132765 A | 7/2013 |
| JP | 2013183155 A | 9/2013 |

\* cited by examiner

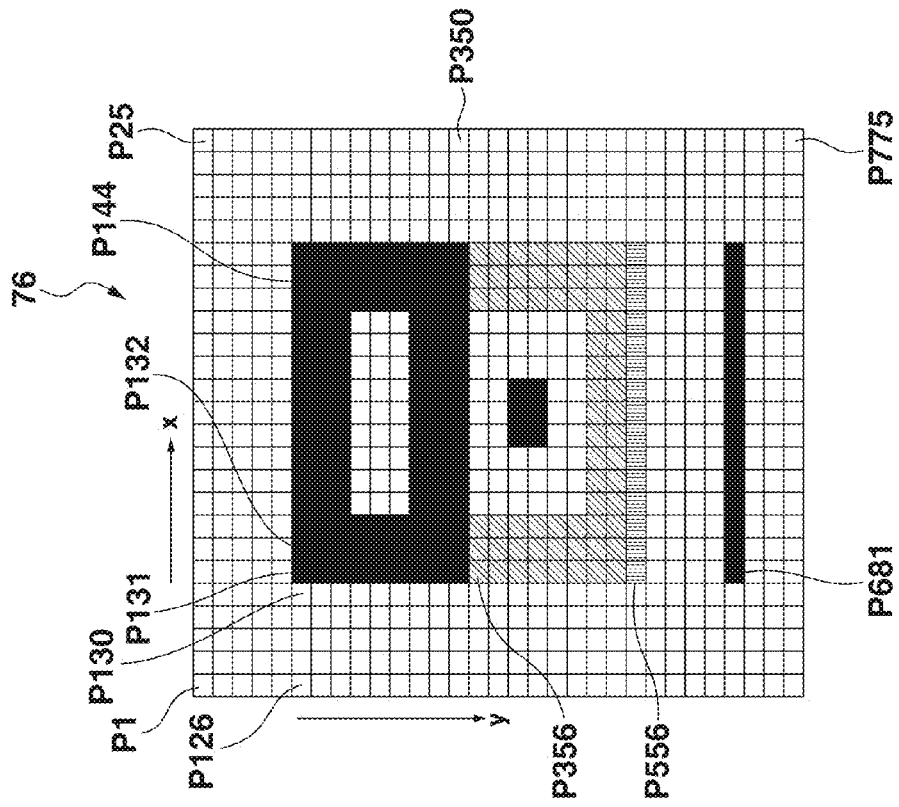
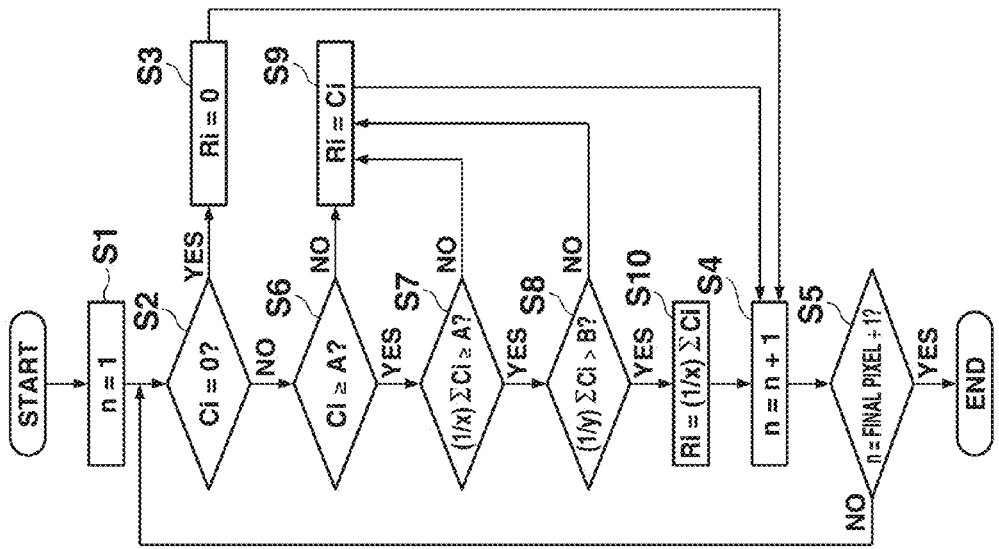

METHOD OF DETERMINING A VALUE OF DENSITY OF A HEAT ABSORBING AGENT, METHOD OF FORMING A THREE-DIMENSIONAL OBJECT, APPARATUS FOR FORMING A THREE-DIMENSIONAL OBJECT, COMPUTER READABLE RECORDING MEDIUM STORING A PROGRAM FOR DETERMINING A VALUE OF DENSITY OF A HEAT ABSORBING AGENT, AND COMPUTER READABLE RECORDING MEDIUM STORING A PROGRAM FOR FORMING A THREE-DIMENSIONAL OBJECT

CROSS-REFERENCE TO RELATED APPLICATION

The present application is based upon and claims the benefit of priority from the prior Japanese Patent Application No. 2014-134972, filed Jun. 30, 2014, the entire contents of which are incorporated herein by reference.

BACKGROUND OF THE INVENTION

1. Field of the Invention

The present invention relates to a method of determining a value of density of a heat absorbing agent, a method of forming a three-dimensional object, an apparatus for forming a three-dimensional object, a non-transitory computer readable recording medium having stored thereon a program for determining a value of density of a heat absorbing agent, and a non-transitory computer readable recording medium having stored thereon a program for forming a three-dimensional object.

2. Description of the Related Art

A conventional three-dimensional printing technique based on a three-dimensional formation method has been put to practical use in a printing in braille, an UV-ink over-glazing, a physical extruding, and a three-dimensional printer. For example, a method using a thermal-expansion sheet to form a three-dimensional image has been proposed by Japanese Unexamined Patent Publication No. Sho54-089638. When applied with a heat treatment, the thermal expansion sheet distends and expands its volume. The formation method applies irradiation light equally over the thermal-expansion sheet with an image printed thereon, and the printed image portion selectively receives heat and rises depending on difference in a light absorption rate, whereby the three-dimensional image is distended.

The conventional three-dimensional image forming method disclosed in Japanese Unexamined Patent Publication No. Sho54-089638 includes a lot of troublesome processes which need much time to produce a three-dimensional image printing. Therefore, this method invites various problems including an increased cost. Further, in the three-dimensional image forming method, the image is formed at first and then the image portion is heated and expanded its volume. Therefore, the external surface of the expanded image portion causes crack, resulting in deterioration in the quality of the three-dimensional image.

To solve these problems involved in the conventional technique, an apparatus, a system and a method for producing a three-dimensional printed-matter of desired parts of an image which are made cheap and of high quality in a simple manner, have been proposed by Japanese Unexamined Patent Publication No. 2012-171317.

The three-dimensional image printing method based on the techniques disclosed in Japanese Unexamined Patent Publication No. 2012-171317 includes processes of producing a solid on a thermal-expansion recording medium as illustrated in FIG. 12A to FIG. 12G, for example, based on the fundamental concept of producing a solid on a thermal-expansion recording medium as illustrated in FIG. 11A, FIG. 11B and FIG. 11C.

The three-dimensional image printing method will be described briefly. FIG. 11A is a view showing a structure of the thermal-expansion recording medium. FIG. 11B is a view for explaining the principle of the process of selectively heating apart of the thermal-expansion recording medium to make thermal expansion. FIG. 11C is a cross sectional view showing the thermal-expansion recording medium which has been subjected to the process shown in FIG. 11B.

As shown in FIG. 11A, the recording medium 1 consists of a substrate 2 and a distending resin layer 3 containing a thermal expansion agent, coated on the substrate 2. As the recording medium 1 consisting of the substrate 2 and the distending resin layer 3, goods available on the market can be used.

For example, an electro-photographic type image forming apparatus is used to print a solid black image 4 with black toner on a portion of the distending resin layer 3 of the recording medium 1, which portion is to be distended or to be made three-dimensional, and the portion, on which the solid black image 4 has been printed is heated by a heater 6 of a heating device 5, as shown in FIG. 11B.

The heating device 5 is composed of (1) a loading table 7 with a pair of parallel guide grooves 8, 8 formed along its both sides, (2) a pair of heater supports 9, 9 which reciprocally move along the guide grooves 8, 8, and (3) the heater 6 supported between the pair of heater supports 9, 9. The heater 6 radiates heat radiation line onto the surface of the distending resin layer 3 of the recording medium 1 received on the loading table 7, while the heater supports 9, 9 are reciprocally moving along the guide grooves 8, 8.

When the solid black image 4 of black toner receives the heat radiation line, the thermal forming agent contained in the distending resin layer 3 expands with heat to form the expanded portion "G" at the portion where the solid black image 4 of black toner has been printed, as shown in FIG. 11C.

When the recording medium 1 is heated by the heater 6, only the thermal forming agent contained in the portion "G" expands to make a three-dimensional portion, since the heat absorption efficiency of the portion "G" which is printed with black toner is higher than a portion "H" which is not printed with black toner.

FIG. 12A to FIG. 12G are views for explaining a three-dimensional image printing process subjected on the thermal-expansion recording medium. At first, a parked motor tricycle 12 is shot with street trees 11a, 11b in the background, as shown in FIG. 12A, whereby a digital image of the motor tricycle 12 is obtained. The motor tricycle 12 and the street trees 11a, 11b are clipped from the digital image, as shown in FIG. 12B.

The clipped images 11a, 11b and 12 are converted to a sheet of solid black image 13, as shown in FIG. 12C. The solid black image 13 is printed on the surface of the distending resin layer of the recording medium 1, as shown in FIG. 12D. Receiving the heat radiation line 14 from the heater 6, the solid black printed portions expand, as shown in FIG. 12E. A solid white image 16 is printed all over the front surface of the recording medium 1, as shown in FIG.

12F. Then, a full color image is printed on the recording medium 1 based on the original image data, whereby a three-dimensional image is produced, as shown in FIG. 12G.

The three-dimensional image formed in the above described manner has two street trees 11a, 11b and the motor tricycle 12. Although not clearly seen from FIG. 12G, these street trees 11a, 11b and the motor tricycle 12 project from the surroundings. The image is printed on the recording medium with the projections formed thereon, and therefore no crack is caused around the projections of the recording medium 1.

In the three-dimensional image printing method disclosed by Japanese Unexamined Patent Publication No. 2012-171317, the portions of a thermal-expansion sheet which are to be distended are printed with heat-absorbing black ink and all over the surface of the thermal-expansion sheet is heated by a halogen lamp. As a result, the heat is conducted to the surroundings (white portions) of the black printed portions and the surroundings (white portions), on which no black ink is printed, are made to distend and expand. This phenomenon is called an "abnormal expansion".

FIG. 13A to FIG. 13C are views showing examples of the "abnormal expansion". FIG. 13A is a view showing a Kanji (Chinese character used in Japanese writing) of "相" printed in black ink on the thermal-expansion sheet. When the thermal-expansion sheet with the Kanji of "相" printed thereon is heated, the surroundings (white portions) of the Kanji of "相" are also heated together with the portion where the Kanji of "相" is printed in black, and are subjected to the "abnormal expansion", whereby the portions close to each other, as indicated by plural arrows "b", are connected together, as illustrated in FIG. 13B.

FIG. 13C is a view schematically illustrating that the portions close to each other are connected together. The view of FIG. 13C shows that the portions where the Kanji of "相" is printed in black and the portions indicated by double-headed arrows have been subjected to the "abnormal expansion". No measures have been proposed for solving the inconvenience caused by the "abnormal expansion".

SUMMARY OF THE INVENTION

According to one aspect of the invention, there is provided a method of determining a value of density of a heat absorbing agent to be applied to a target pixel on a medium, wherein the medium is distended, when heated, and the value of density of the heat absorbing agent is a density value of the heat absorbing agent that is applied on a surface of the medium before the medium is heated, and the density values of the heat absorbing agent are set for plural pixels which correspond to the surface of the medium, respectively, the method which comprises calculating a first average original density value of first plural pixels located in the vicinity of the target pixel among the plural pixels, calculating a second average original density value of second plural pixels located in the vicinity of the target pixel among the plural pixels, and determining a density value of the heat absorbing agent based on the calculated first average original density value of the first plural pixels and the calculated second average original density value of the second plural pixels, and setting the determined density value as the density value of the heat absorbing agent to be applied to the target pixel, when an original density value of the heat absorbing agent applied to the target pixel satisfies a first prescribed condition.

According to another aspect of the invention, there is provided a non-transitory computer readable storing medium with an executable program stored thereon, wherein the medium is distended, when heated, and the value of density of the heat absorbing agent is a density value of the heat absorbing agent that is applied on a surface of the medium before the medium is heated, and the density values of the heat absorbing agent are set for plural pixels which correspond to the surface of the medium, respectively, and wherein the executable program, when installed on a computer, makes the computer execute functions of (a) calculating a first average original density value of first plural pixels located in the vicinity of a target pixel among the plural pixels, (b) calculating a second average original density value of second plural pixels located in the vicinity of the target pixel among the plural pixels, and (c) determining a density value based on the calculated first average original density value of the first plural pixels and the calculated second average original density value of the second plural pixels, and setting the determined density value as a density value of the heat absorbing agent to be applied to the target pixel, when an original density value of the heat absorbing agent applied to the target pixel satisfies a first prescribed condition.

According to other aspect of the invention, there is provided a method of forming a three-dimensional object, the method including distending a medium by heating and further including determining a value of density of a heat absorbing agent which is applied on a surface of the medium before the medium is heated, values of density of the heat absorbing agent being set respectively for plural pixels which correspond to the surface of the medium, the method which comprises (a) calculating a first average original density value of first plural pixels located in the vicinity of a target pixel among the plural pixels, (b) calculating a second average original density value of second plural pixels located in the vicinity of the target pixel among the plural pixels, and (c) determining a density value of the heat absorbing agent based on the calculated first average original density value of the first plural pixels and the calculated second average original density value of the second plural pixels, and setting the determined density value as a density value of the heat absorbing agent to be applied to the target pixel, when an original density value of the heat absorbing agent applied to the target pixel satisfies a first prescribed condition.

According to still another aspect of the invention, there is provided an apparatus for forming a three-dimensional object by distending a medium through heating, the apparatus which comprises a controlling unit which determines values of density of a heat absorbing agent that are applied on a surface of the medium before the medium is heated, the values of density of the heat absorbing agent being set respectively for plural pixels which correspond to the surface of the medium, a printing unit which applies the heat absorbing agent on the surface of the medium in accordance with the values of density determined by the controlling unit, before the medium is heated, and a heating unit which heats by heating the heat absorbing agent applied on the surface of the medium, and wherein the controlling unit determines a value of density based on a first average original value of density of density of first plural pixels located in the vicinity of a target pixel among the plural pixels and a second average original value of density of density of second plural pixels located in the vicinity of the target pixel, and sets the determined value of density as a value of density of the heat absorbing agent to be applied to the target pixel, when an original value of density of the heat absorbing agent applied to the target pixel satisfies a first prescribed condition.

According to yet another aspect of the invention, there is provided a non-transitory computer readable storing medium with an executable program stored thereon, the storing medium being mounted on an apparatus for forming a three-dimensional object by distending a medium by heating, the apparatus comprising a computer, a controlling unit, a printing unit, and a heating unit, wherein the computer reads the executable program to make the controlling unit determine values of density of a heat absorbing agent that is applied on the surface of the medium before the medium is heated, the values of density of the heat absorbing agent are set respectively for plural pixels which correspond to the surface of the medium, and further making the printing unit apply on the surface of the medium the heat absorbing agent in accordance with the values of density of determined by the controlling unit and the heating unit heat the medium by heating the heat absorbing agent applied on the surface of the medium, and wherein the computer makes the controlling unit determine a value of density based on a first average original value of density of first plural pixels located in the vicinity of a target pixel among the plural pixels and a second average original value of density of second plural pixels located in the vicinity of the target pixel, and sets the determined value of density as a value of density of the heat absorbing agent to be applied to the target pixel, when an original value of density of the heat absorbing agent applied to the target pixel satisfies a first prescribed condition.

BRIEF DESCRIPTION OF THE DRAWINGS

The features and advantages of the present invention will apparently be understood by reading the following detailed description of the embodiments of the invention, when taken in conjunction with the accompanying drawings.

FIG. 10A is a flowchart of a density converting process to be performed based on two equations (1) and (2).

FIG. 10B is a view showing an example of an image whose density is to be converted in accordance with the process shown in FIG. 10A.

DETAILED DESCRIPTION OF THE PREFERRED EMBODIMENTS

A printing apparatus according to the embodiments of the invention will be described with reference to the accompanying drawings in detail. In the following description, an expression of "printing characters" and an expression of "printing" have the same meaning.

First Embodiment

Figure 1:
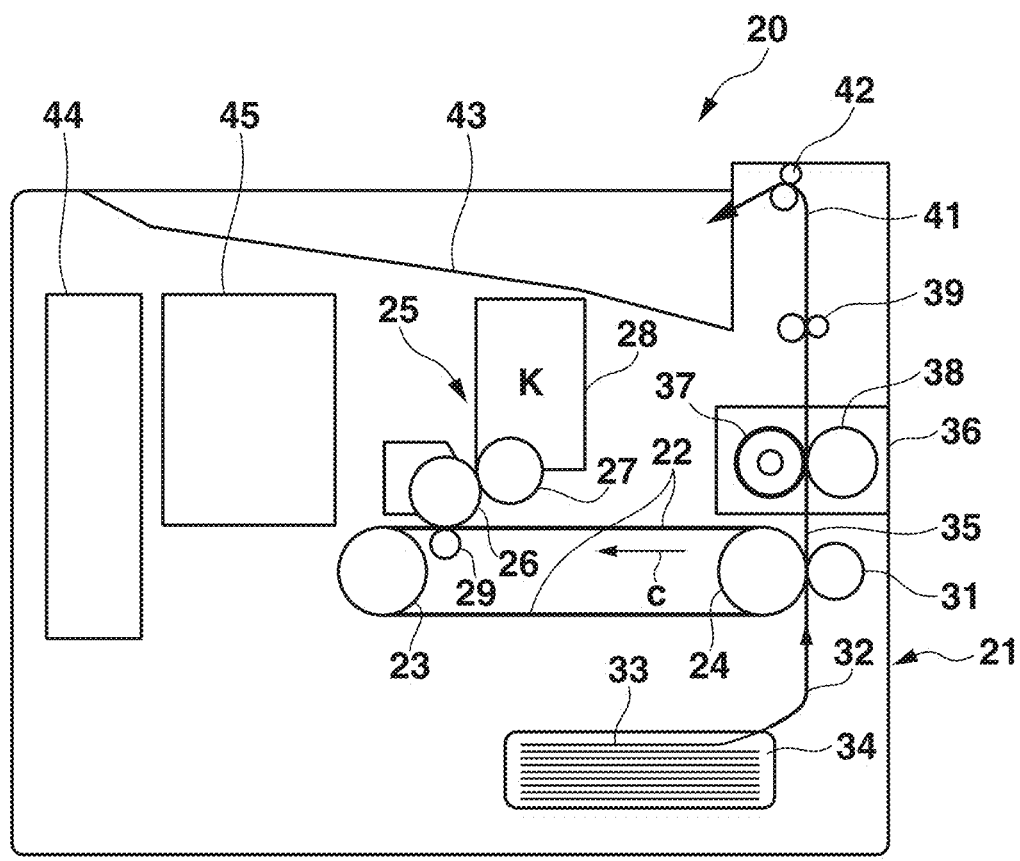
FIG. 1 is a cross sectional view schematically showing in internal structure of a black-toner printing apparatus according to the first embodiment of the invention.

FIG. 1 is a cross sectional view schematically showing an internal structure of a black-toner printing apparatus according to the first embodiment of the invention. As shown in FIG. 1, the black-toner printing apparatus 20 is provided with an endless transfer belt 22 approximately at the center of its apparatus housing 21, wherein the transfer belt 22 extends substantially in the horizontal direction.

The transfer belt 22 is supported by a support/stretching mechanism (no shown) and stretched between a driving roller 23 and a driven roller 24. The transfer belt 22 is circulated in the counter clockwise direction by the driving roller 23, as indicated by an arrow "c" in FIG. 1.

An image forming unit 25 is provided with a photosensitive drum 26, which is arranged so as to contact with an upper surface of the transfer belt 22. As not shown in FIG. 1, a cleaner, an initializing charging device, an optical writing head, and a development roller 27 are disposed so as to surround the peripheral surface of the photosensitive drum 26.

The development roller 27 is disposed at a side opening of a toner container 28. The toner container 28 contains black toner "K". The black tone "K" is composed of non-magnetic one-component toner. Two-component developer composed of carrier and toner can be used.

The development roller 27 carries a thin layer of the black toner "K" contained in the toner container 28 on its outer surface and develops an image of the black toner "K" on the peripheral surface of the photosensitive drum 26 in accordance with an electrostatic latent image formed by the optical writing head.

A primary image transferring unit is provided beneath the photosensitive drum 26. The primary image transferring unit has a primary transfer roller 29 which is pressed against the photosensitive drum 26 with the transfer belt 22 held between them. The primary transfer roller 29 is supplied with a bias voltage from a bias power source (not shown).

In the primary image transferring unit, the primary transfer roller 29 applies the bias voltage of the bias power source to the transfer belt 22, thereby transferring the image of the black toner "K" developed on the peripheral surface of the photosensitive drum 26 onto the transfer belt 22.

A secondary image transferring unit is provided in the vicinity of the driven roller 24, on which the transfer belt 22 is put, as shown in FIG. 1. A secondary transfer roller 31 is pressed against the driven roller 24 with the transfer belt 22 held between them. The secondary transfer roller 31 is supplied with a bias voltage from a bias power source (not shown).

In the secondary image transferring unit, the secondary transfer roller 31 applies the bias voltage of the bias power source to the transfer belt 22, thereby transferring the image of the black toner "K" primarily transferred on the transfer belt 22 onto a recording medium 33, which is conveyed from beneath along an image forming conveyance path 32 (as seen in FIG. 1). In the present embodiment, a thermally distending sheet is used as the recording medium 33.

The recording media 33 are stacked and contained in a recording-media accommodation unit 34 such as a paper feeding cassette. One from the uppermost part of the recording media 33 is taken out by a paper feeding roller (not shown) or a paper separating member (not shown) and sent out to the image forming conveyance path 32. The recording medium 33 is further conveyed along the image forming conveyance path 32 to the secondary image transferring unit. Then, the image of black toner "K" is transferred onto the recording medium 33 while the same 33 is passing through the secondary image transferring unit.

The recording medium 33, on which the image of back toner "K" has been transferred in the secondary image transferring unit is further conveyed along a fixing conveyance path 35 to a fixing unit 36. In the fixing unit 36, a heat roller 37 and a pressing roller 38 pinch the recording medium 33 between them to apply heat and pressure on it.

While the recording medium 33 is being pinched between the heat roller 37 and the pressing roller 38, the image of black toner "K" transferred on the recording medium 33 is fixed thereon. Then, the recording medium 33 is further conveyed by the heat roller 37 and the pressing roller 38 toward a discharge roller pair 39. The recording medium 33 passes through a discharge conveyance path 41 and discharged by an ejection roller pair 42 onto a paper ejection tray 43 provided at the upper portion of the printer housing 21.

In the fixing unit 36, since the recording medium (thermally distending sheet) 33 is conveyed at a relatively fast conveyance rate, portions printed in black (parts of black toner "K") of the thermally forming sheet are not distended and intumesced by heat of the heat roller 37.

Within the printer housing 21, a cooling fan 44 is installed at the left upper portion, and an electric component unit 45 is mounted next to the cooling fan 44. The electric component unit 40 includes plural controlling devices having electronic parts installed on circuit substrates.

Figure 2:
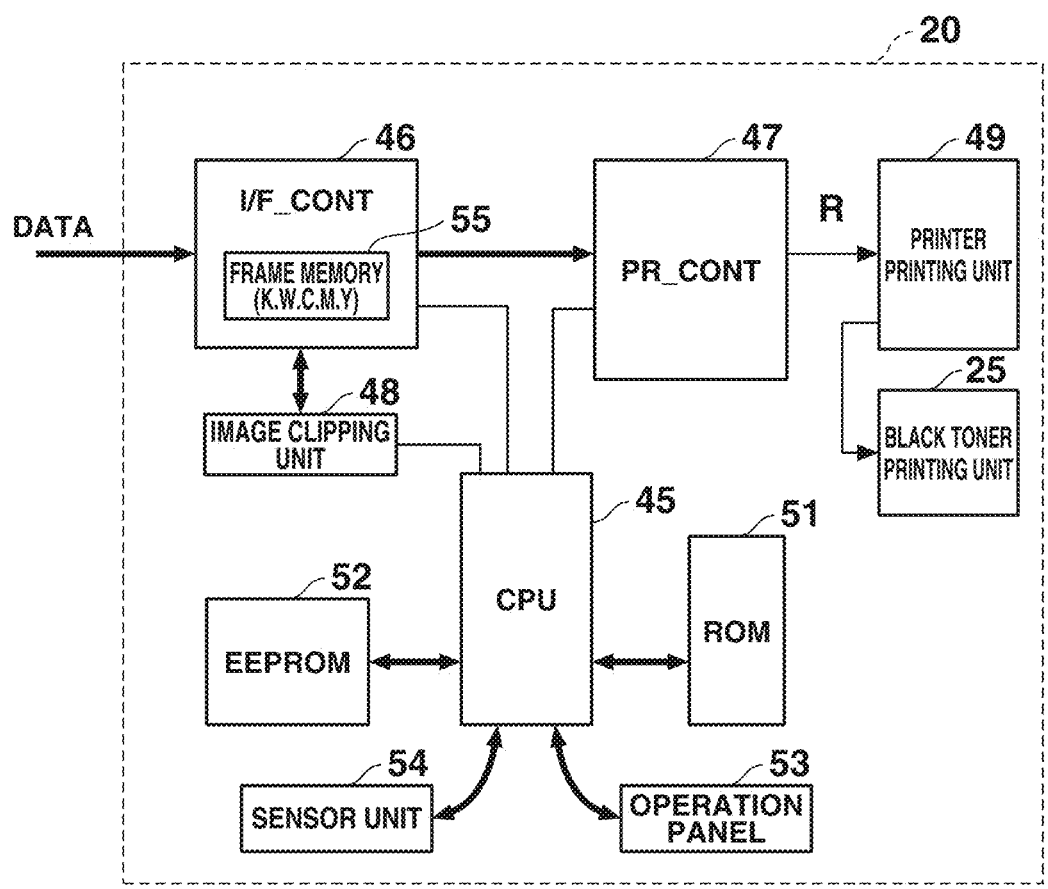
FIG. 2 is a block diagram of a construction of the black-toner printing apparatus including a controlling apparatus.

FIG. 2 is a block diagram of a construction of the black-toner printing apparatus 20 including a controlling apparatus. As shown in FIG. 2, the controlling circuit comprises CPU (Central Processing Unit) 45, an interface controller (I/F controller) 46, a printer controller (PR controller) 47 and an image clipping unit 48, all of which are connected to each other though a data bus.

The PR controller 47 is connected with a printing unit 49. The image clipping unit 48 is connected to the I/F controller 46. An image processing application which is the same as that installed on a personal computer is installed on the image clipping unit 48.

Further, CPU 45 is connected with ROM (Read Only Memory) 51, EEPROM (Electrically Erasable Programmable ROM) 52, an operation panel 53, and a sensor unit 54. The sensor unit 54 receives outputs form sensors installed at various parts of the printing apparatus 20. ROM 51 stores a system program. The operation panel 53 is provided with a touch-type display screen.

CPU 45 reads the system program stored in ROM 51 to control operations of various parts of the printing apparatus 20.

More specifically, the I/F controller 46 receives printing-character data from host equipment such as a personal computer and converts the received data into bit map data to expand on a frame memory 55.

The frame memory 55 has a storing area corresponding to the printing-character data of black toner "K". The printing-character data of black toner "K" is expanded over the storing area of the frame memory 55. The expanded printing-character data is output to the PR-controller 47, and further, the PR-controller 47 outputs the expanded printing-character data to the printing unit 49. The printing-character data of black toner "K" includes information of an additional density of the black toner "K" which is set for each of plural pixels corresponding to the surface of the medium to be printed with black toner "K" or information of plural additional densities of the black toner "K" set for the plural pixels.

The printing unit 49 composes an engine unit of the printing apparatus 20, and controls a voltage to be applied to the image forming unit 25 and further controls a driving voltage for driving the transfer belt 22 and the fixing unit 36 under control of the PR-controller 47, wherein the image forming unit 25 is provided with a rotation driving system including the photosensitive drum 26 and the primary transfer roller 29 shown in FIG. 1 and a driven system including the initializing charging device and the optical writing head not shown in FIG. 1.

The image data of black toner "K" from the PR-controller 47 is supplied to the printing unit 49 and further to the optical writing head (not shown) of the image forming unit 25 (the black toner printing unit shown in FIG. 1).

Figure 3:
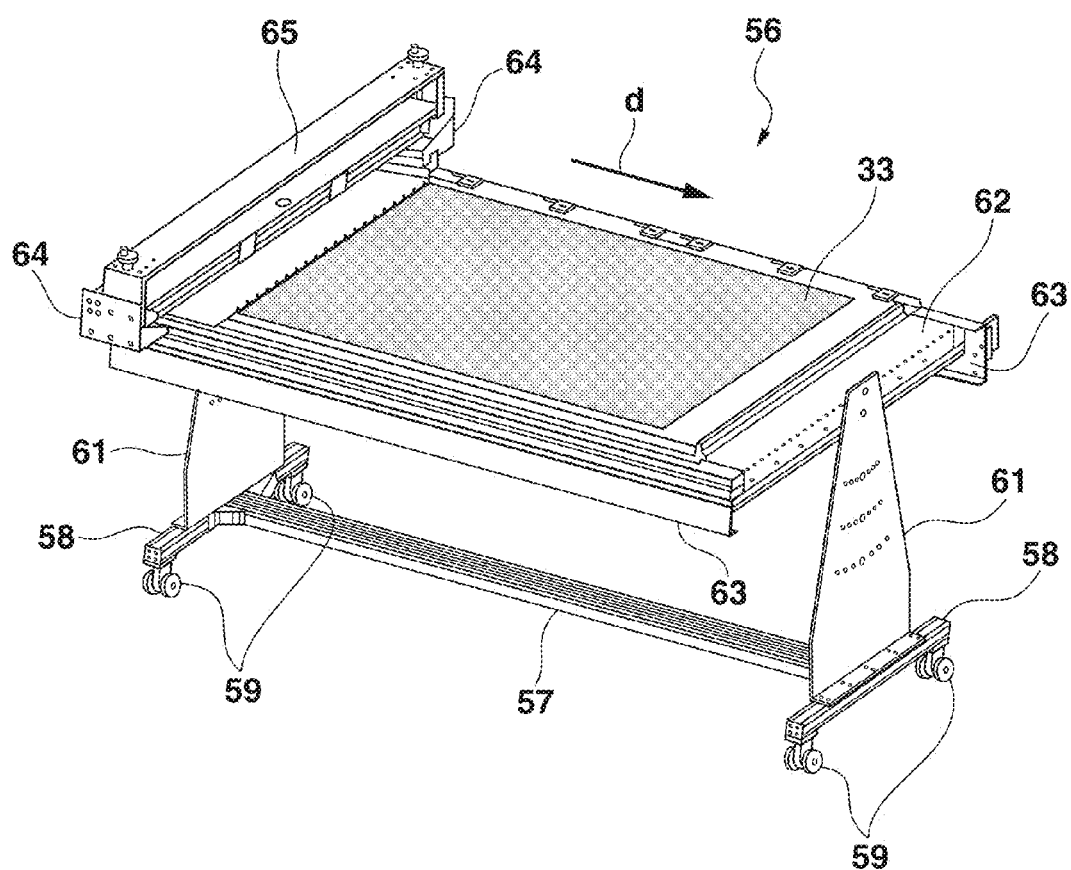
FIG. 3 is a perspective view showing a heating device used to heat a thermally distending sheet which is printed by the black-toner printing apparatus for a thermally distending purpose.

FIG. 3 is a perspective view showing a heating device used to heat the recording medium (thermally distending sheet) 33 printed by the black-toner printing apparatus 20 for a thermally distending purpose.

As shown in FIG. 3, the heating device 56 consists of an elongated base 57, supporting members 58, 58 extending in the lateral direction from the both end portions of the elongated base 57, respectively, and four casters 59 fixed at the both ends of the supporting members 58, 58.

Each supporting member 58 is provided with a platy support 61, and a rectangular mounting-table 62 is fixedly supported at its both end sides in the elongated direction by the top portions of the platy supports 61, 61. The mounting-table 62 is provided with rails 63, 63 at it both sides along the longitudinal direction.

A halogen lamp unit 65 is mounted on the one ends of the both rails 63, 63 by means of holding members 64. In FIG. 3, the recording medium (thermally distending sheet) 33 placed on the mounting-table 62 is also shown.

Guided by along the rails 63, 63, the halogen lamp unit 65 can move from the home position (the right side position shown in FIG. 3) to the other side of the mounting-table 62 over the front surface of the recording medium (thermally distending sheet) 33, as indicated by an arrow "d".

The halogen lamp unit 65 moves from the home position to the other side of the mounting-table 62, while applying irradiation light toward the front surface of the recording medium (thermally distending sheet) 33 printed with ink containing thermal-expansion microcapsules. The portion of the recording medium 33 which has been printed with black toner absorbs a heat volume proportional to printing density of the black toner, and the absorbed heat volume is conducted to the recording medium 33. As a result, the portion of the recording medium 33 which has been printed with black toner receives the heat volume proportional to the printing density of the black toner.

Figure 13A:
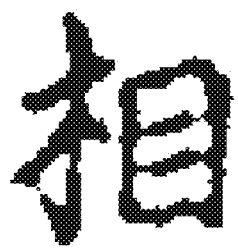
FIG. 13A to FIG. 13C are views showing examples of the "abnormal expansion" of the thermally distending medium.
Figure 13B:
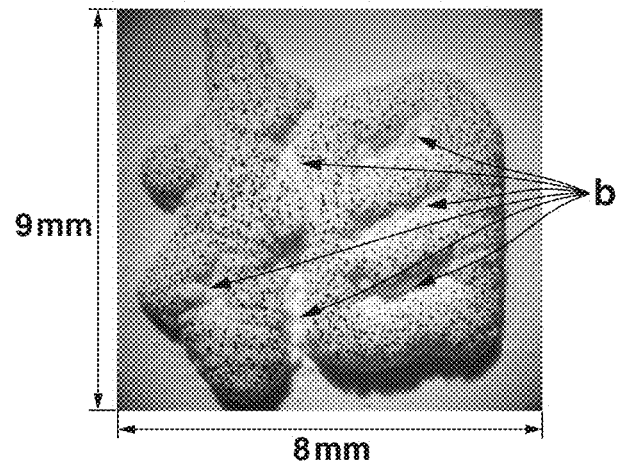
Figure 13C:

Now, the problem will be considered, which is caused in the recording medium (thermally distending sheet) 33 by the "abnormal expansion", as described with reference to FIG. 13B and FIG. 13C. A simple figure will be used for easy understanding in the following explanation.

Figure 4A:
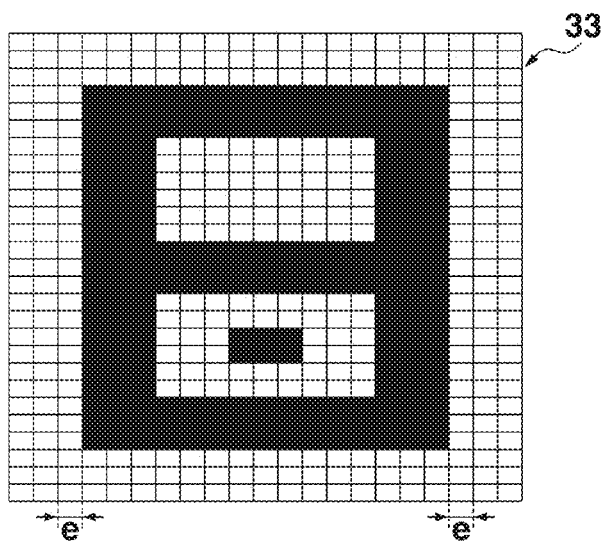
FIG. 4A and FIG. 4B are views for explaining a problem caused in the thermally distending sheet.
Figure 4B:
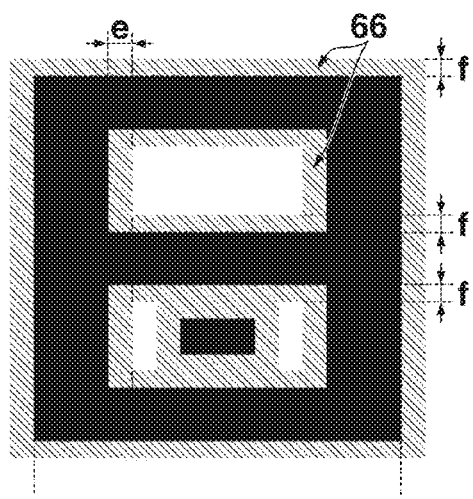
Figure 4C:
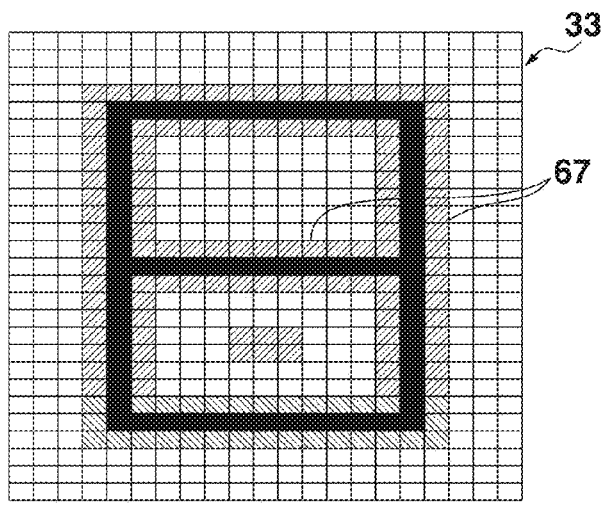
FIG. 4C is a view for showing the principle of a measure for solving the problem.

FIG. 4A and FIG. 4B are views for explaining the problem (thermal expansion) caused in the thermally distending sheet (hereinafter, referred to as the "distending paper" 33), when heat is applied thereto. FIG. 4C is a view for showing the principle of measures for solving such problem (thermal expansion). In the distending paper 33 shown in FIG. 4A and FIG. 4C, one division denotes one pixel and only a printing area of the distending paper 33 consisting of 22×27 pixels is displayed.

FIG. 4A is a view showing the forming paper 33, on which an image is printed with black toner serving as a heat absorbing agent at a printing density of 100% or showing the distending paper 33, on which an image is printed in solid-printing with black toner. In the distending paper 33, on which the solid image printed with black toner, black pixels within the solid black image are to be distended and the other pixels are not to be distended. When the solid black image printed with black toner at the printing density of 100% is heated, the pixels within the solid black area are heated and in addition to these pixels, the heat is conducted to other pixels which are in the vicinity of the pixels within the solid black area. In other words, the heat is conducted to the pixels other than the pixels within the solid black area to make them distend.

Therefore, the excess portions (indicated by hatching) 66 surrounding the solid black image are distend as shown in FIG. 4B. The excess portion substantially corresponds to one pixel having a width "e" or "f".

As illustrated in FIG. 4C, it is considered that the pixels located substantially at the central portions of the solid black image are printed at the printing density of 100%, that is, the pixels located substantially at the central portions of the solid black image are printed in solid printing with black toner, and the other pixels located at portions 67 (indicated by hatching) surrounding the above central portions in the solid black image are printed at a less printing density.

Then, the heat applied to the solid black portions is conducted to the surrounding portions 67 to make the same portions 67 distend, but the heat conducted to the surrounding portions is hardly conducted to white portions. As a result, it is considered that the recording medium 33 will be heated and distended in the shape approximating the solid black image (original image) as shown in FIG. 4A.

Therefore, to prevent the white portions of the original image from distending, it is considered to change the printing densities of at least a part of pixels out of the plural pixels composing the original image. More specifically, the plural pixels composing the original image are scanned, whereby the printing densities thereof are obtained, and the printing density of each pixel is replaced with an average density ("average nine-pixel density") of the nine pixels adjacent to the target pixel. Meanwhile, the printing densities of pixels located in the white portion (density 0%) are kept unchanged.

Figure 5A:
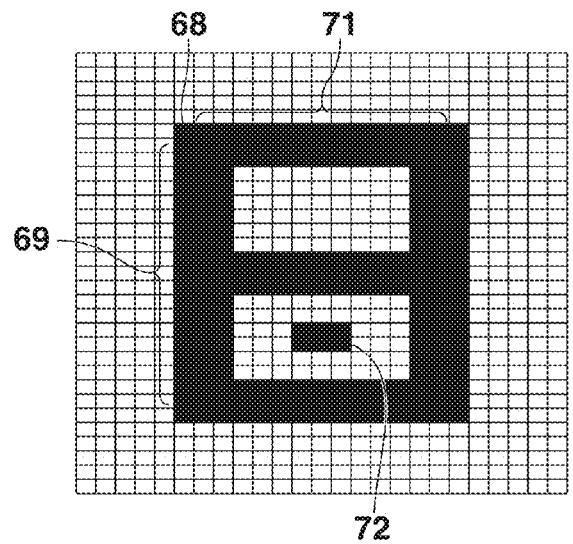
FIG. 5A is a view showing an original image to be distended and represented on the thermally forming sheet.
Figure 5B:
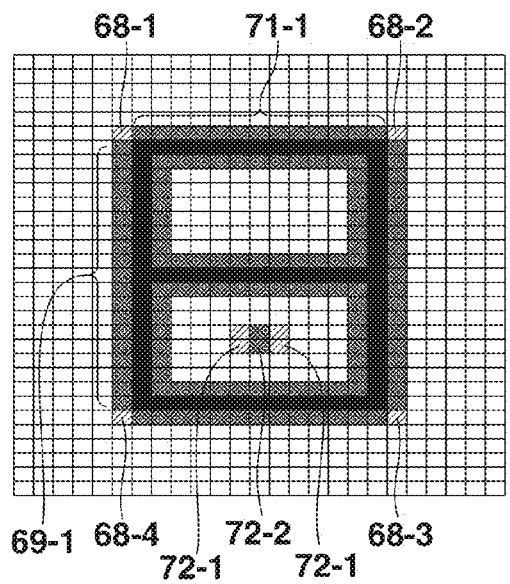
FIG. 5B is a view showing an example of the densities of the pixels of the original image, each of densities being replaced with an average density of the nine adjacent pixels including the target pixel itself.

FIG. 5A is a view showing the original image to be distended and represented on the distending paper (thermally forming sheet) 33. The original image (hereinafter, referred to as the "figure") shown in FIG. 5A is the same image as shown in FIG. 4A. FIG. 5B is a view showing an example of the densities of the pixels of the figure (original image), each of which densities is replaced with the average density of the nine pixels including the target pixel itself.

Figure 5C:
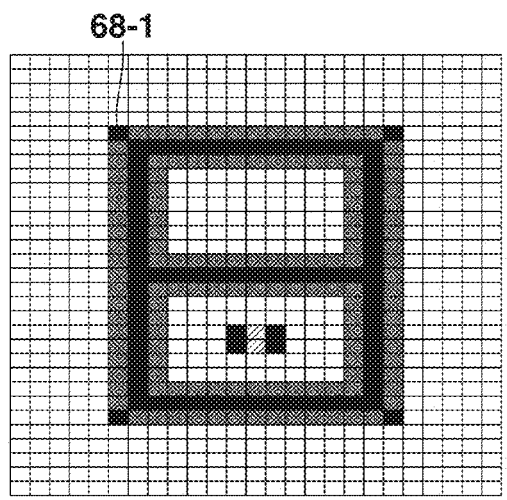
FIG. 5C is a view showing pixels of the original image, whose replaced average nine-pixel density is set to the original printing density, again.
Figure 5D:
FIG. 5D is a view illustrating the density of 0% to 100% in five levels.

FIG. 5C is a view illustrating that the pixels 68-1, 68-2, 68-3, and 68-4 located at the four outermost corners of the original image (figure), and the four pixels 72-1 in the lower white region shown in FIG. 5B maintain the original density while the densities of other pixels are replaced with the average nine-pixel density, because the average nine-pixel densities of the pixels 68-1, 68-2, 68-3, 68-4, and 72-1 will be too low, if replaced. FIG. 5D is a view clearly illustrating the density from 0% to 100% in five levels.

In the examples shown in FIG. 5A, FIG. 5B and FIG. 5C, one division denotes one pixel and a printing area consisting of 25×31 pixels is displayed. A pixel to be printed at the density of 0% is represented by a white division and a pixel to be printed at the density of 100% is represented by a solid black division.

It is assumed that the white plain pixel of density of 0% is denoted by a density value of "0" and the solid black pixel of density of 100% is denoted by a density value of "1", and the pixel of density falling within the range from 0% to 100% is denoted by a density value falling within the range from "0" to "1".

It is considered that the density value "1" of the pixel (located at the top left corner) 68 in FIG. 5A is replace with the average value (average nine-pixel density) of the printing densities of the nine adjacent pixels. The density values of the nine adjacent pixels with the pixel 68 held at the center will be "0, 0, 0, 0, 1, 1, 0, 1, 1" (from top to bottom and from left to right).

Then, the average density value of the nine adjacent pixels will be 4/9=0.4444≈0.4 That is, the density value (average nine-pixel density) of the pixel 68-1 located at the corner in FIG. 5B will be about 0.4. Similarly, concerning the other pixels (68-2, 68-3, and 68-4) located at the three other corners, their density value will be about 0.4.

Concerning the pixels at the peripheral of the original image (figure) other than the pixels at the four corners, when the pixels 69 disposing vertically on the left side in FIG. 5A are taken for example, the density values of the nine adjacent pixels with the respective pixel 69 held at the center will be "0, 0, 0, 1, 1, 1, 1, 1, 1". The average density value of the nine adjacent pixels will be 6/9=0.6666≈0.7. That is, the density value (average nine-pixel density) of each of the pixels 69-1 vertically disposing at the peripheral in FIG. 5B will be about 0.7.

When the pixels 71 disposing horizontally on the top of the original image (figure) in FIG. 5A are taken for example, the density values of the nine adjacent pixels with the respective pixel 71 held at the center will be "0, 1, 1, 0, 1, 1, 0, 1, 1". The average density value of the nine adjacent pixels will be 6/9=0.6666≈0.7. That is, the density value (average nine-pixel density) of each of the pixels 71-1 horizontally disposing at the peripheral in FIG. 5B will be about 0.7.

Concerning the six pixels 72 gathering to the center of the downward white area, when their densities are replaced with their average nine-pixel densities, respectively, the density value (average nine-pixel density) of each of the two pixels 72-1 located at the both sides will be about 0.4 and the density value (average nine-pixel density) of each the pixels 72-2 at the center will be about 0.7. The five levels of the density shown in FIG. 5D will be described hereinafter.

When the density of a pixel (hereinafter, the "pixel density") which has not been converted or has not been replaced with an average nine-pixel density is denoted by "Ci" and the pixel density (decided additional density) which has been converted or has been replaced with the average nine-pixel density is denoted by "Ri", then the five levels of the pixel density "Ci" or "Ri" will be represented as follows. As shown in FIG. 5D, a "white plain" represents "Ci (or Ri)=0", a "vertical hatching" represents "0<Ci (or Ri)≤0.15", a "slant hatching" represents "0.15<Ci (or Ri)<0.5", a "double hatching" represents "0.5≤Ci (or Ri)<1", and a "solid black" represents "Ci (or Ri)=1".

In the case where the same figure as the original image shown in FIG. 5A is printed, if the average nine-pixel density is applied to the whole figure to which the density lower than Ci=1 has been set, a phenomenon will be noted which will reduce to a prescribed value or less the density to be applied to some pixels other than the pixels 68-1 to 68-4 located at the four corners and the pixels 72-1 located separately at the both sides.

Figure 6A:
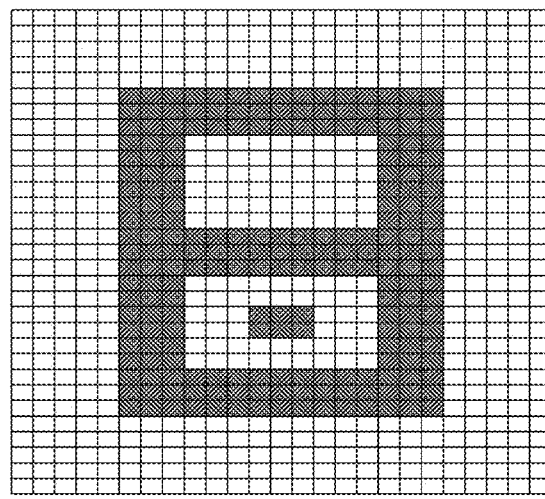
FIG. 6A and FIG. 6B are views for explaining a phenomenon that when the average nine-pixel density is applied to the whole image of low original density, the replaced density will be made lower than a prescribed density.
Figure 6B:
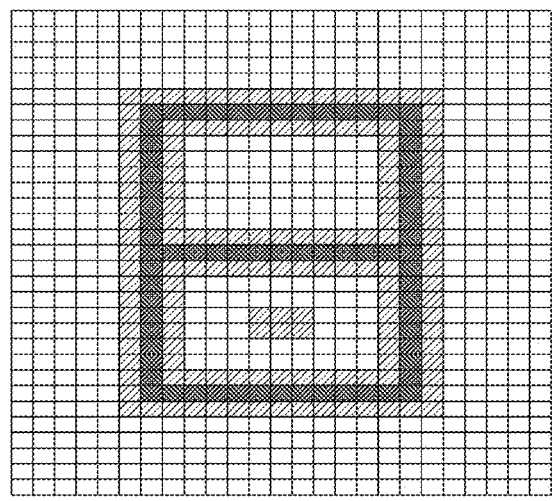

FIG. 6A and FIG. 6B are views for explaining a phenomenon that when the average nine-pixel density is applied to the whole figure, to which a low density has been set, the density will be decreased lower than the prescribed density. The figure of the image shown in FIG. 6A is the same figure as shown in FIG. 5A, but the density set to the whole figure falls within the range from not less than 50% to lower than 100%, that is, the density set to the whole figure corresponds to "0.5≤Ci<1 (double hatching)".

For example, in the case where the density of 50% is set to all the pixels (the whole figure) shown in FIG. 6A, when the density set to the whole figure is evenly replaced with the average nine-pixel density, the average nine-pixel densities of the pixels located at the central portions of the figure shown in FIG. 6B will be "0.5, 0.5, 0.5, 0.5, 0.5, 0.5, 0.5, 0.5, 0.5". Therefor, the average of the nine average nine-pixel densities will be "0.5". As a result, the original density will be maintained for the pixels located at the central portions of the figure. The density of the inside and the outside of the central portions of the figure will be given by "0.15<Ri<0.5" ("slant hatching"). More specifically, the density will be 0.3 or 0.4, and can decrease to 0.2.

When the average density of the target pixel is not higher than 0.5, a heat absorbency of the target pixel decreases, whereby the distensibility of the pixel itself is made reduced, in addition to preventing the adjacent pixels in the white area from distending. As a result, a formation in accordance with the original image will be failed.

To avoid the above inconvenience, the original density will be maintained for the pixel, to which the average nine-pixel density of not higher than 0.5 will be applied. And when the density of the original image is not higher than 0.5, the density of the original image is note replaced with the average nine-pixel density, and the original image keeps the original density.

Figure 6C:
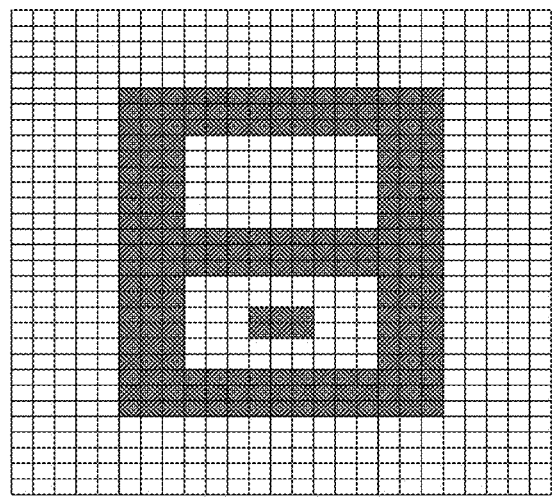
FIG. 6C is a view illustrating the image whose average nine-pixel density of 0.5 or less is set to the original density.

Even in the case of an image, to which a low density is applied, such as the image, to which the density of 0.5 is set, as shown in FIG. 6A, since the density set to the respective pixels of the image is 0.5 or not less, the original density is maintained for all the pixels. As a result, the original image is maintained as shown in FIG. 6C and the original distensibility of the image will be maintained.

Now, the above process will be summarized as follows: when "Ci≤A" or "Ri≤A" is true, where the original pixel density which has not been converted is denoted by Ci (original density), the pixel density which has been converted or replaced with an average nine-pixel density is denoted by Ri (decided additional density), and the threshold value "A" of the density is 0.5, then the original pixel density is maintained.

In the image shown in FIG. 5B, the converted densities Ri (the average nine-pixels densities) of the pixels 68-1 to 68-4, 72-1, and 72-2 meet "Ri≤A". As shown in FIG. 5C, the converted densities Ri of the pixels 68-1 to 68-4, 72-1, and 72-2 are made to meet "Ri=Ci", whereby the pixels 68-1 to 68-4, 72-1, and 72-2 maintain their original densities Ci. Since these pixels are surrounded by the large white area, the heat applied to these pixels is not conducted to the periphery of the pixels to distend the periphery. But these pixels themselves receive the heat enough to keep the distensibility.

Figure 7A:
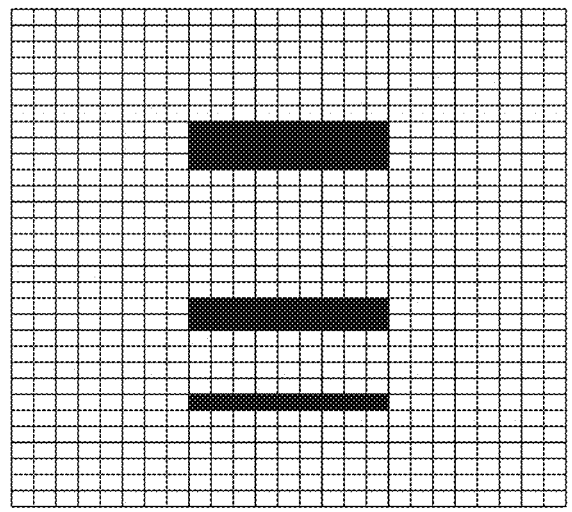
FIG. 7A and FIG. 7B are views illustrating other examples of defects appearing in the whole distending image, whose density is evenly replaced with the average nine-pixel density.
Figure 7B:
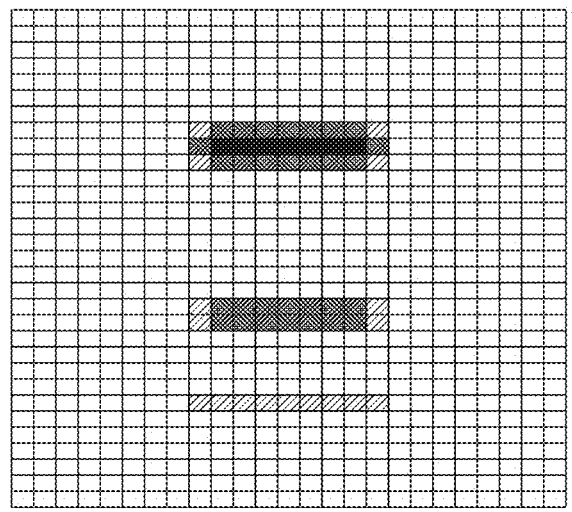
Figure 7C:
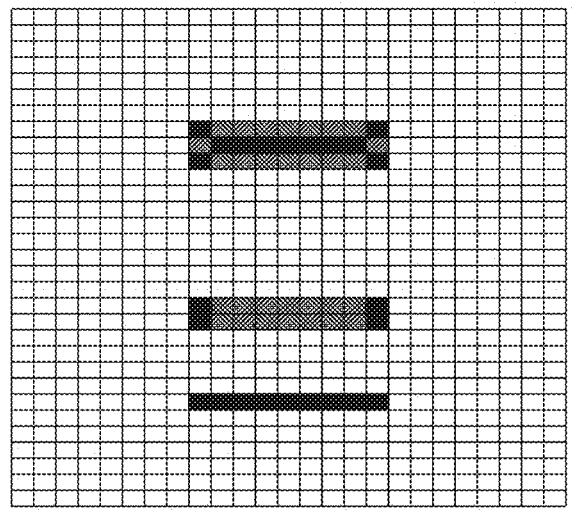
FIG. 7C is a view illustrating the image, whose pixel density falling within the range of "Ri≤A" is set to the density of "Ri=Ci", whereby the original density "Ci" is maintained.

FIG. 7A and FIG. 7B are views illustrating other examples of inconveniences caused in the image printed on the distending sheet, whose density is evenly converted or replaced with the average nine-pixel density. FIG. 7C is a view illustrating that the pixels of the image, whose converted density falls within the range of "Ri≤A" is set to meet "Ri=Ci", whereby the original density Ci of the pixels is maintained.

In FIG. 7A, three horizontal lines are shown. As shown in FIG. 7B, the converted densities Ri of the pixels located at four corners of the uppermost line meet "0.15<Ri<0.5" (slant hatching) or are decreased excessively.

When the density of the two other lines is replaced with the average nine-pixel density, such density for the two lines will decrease excessively, losing the distensibility set to the original image.

Even though the converted densities of the pixels which meet "Ri≤A" are set to the original densities ("Ri=Ci"), the average nine-pixel density of the middle line is 0.7 and a decline in the distensibility of the middle line (image) is inevitable, because the converted density Ri of the middle line is larger than the threshold value "A" except for the two pixels located at both ends of the middle line. Meanwhile, the original density of 1.0 set to the bottom line can be maintained because the converted density Ri is not larger than the threshold value "A".

It will be considered that measures focusing only on the density of the image, such as the employment of the average nine-pixel density and the judgment of the density based on the threshold value "A", hardly avoid the decline in the distensibility of the middle line (image). A measure, in which an area of the image is taken into consideration, will be necessary to reduce the decline in the distensibility of the middle line (image).

To reduce the decline in the distensibility due to a shape of the "figure", a concept of an average density of 121 pixels with a target pixel held at the center is employed, wherein the average density of 121 pixels is given by "$(1/y)\Sigma Ci$", where y=121. For instance, the pixel located at the top left corner of the figure shown in FIG. 7A is taken as the target pixel and the average density (average 121-pixel density) of 121 pixels surrounding the target pixel is calculated. The area where the 121 pixels are distributed is wider than the area where the above nine pixels are distributed, and includes the latter.

Figure 8A:
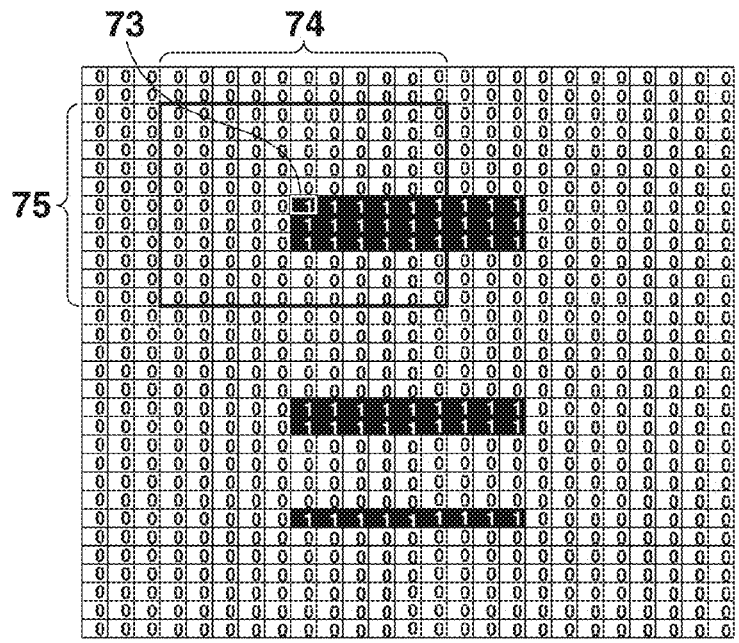
FIG. 8A is a view showing an enlarged figure with the printing densities of "0" entered therein, whose original figure is shown in FIG. 7A.

FIG. 8A is a view showing an enlarged figure with the density values of "0" entered therein, whose original figure is shown in FIG. 7A. In FIG. 8A, the density value of the solid black portion is "1". The pixel locating at the top left corner of the uppermost line is the pixel 73. The region of 121 pixels with the target pixel 73 held at the center is defined by an 11×11 pixel square (denoted by numerals, "74" and "75").

Now, the average 121-pixel density of the target pixel 73 is calculated. As shown in FIG. 8A, (3×6) pixels, that is, 18 pixels among the 121 pixels have the density of "1" and therefore the average density of 121 pixels, "$(1/y)\Sigma Ci$" (y=121) will be 18/121 (≈0.14). Since the target pixel 73 should keep the original density of "1", it is decided that if the average 121-pixel density of the target pixel 73 is not larger than 0.15, the target pixel 73 maintains the original density of "1".

Figure 8B:
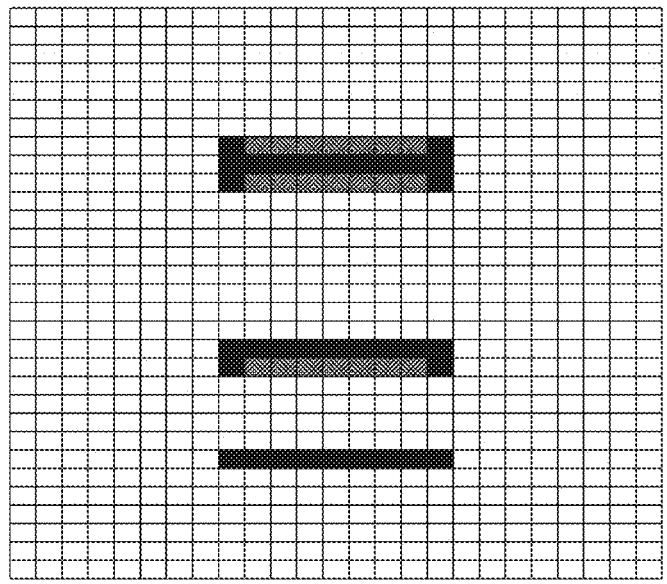
FIG. 8B is a view showing that all the pixels whose average 121-pixel density is not larger than 0.15 maintain the original density of 1 and the other pixels have the average nine-pixel density.

FIG. 8B is a view showing that all the pixels whose average 121-pixel density is not larger than 0.15 in FIG. 8A maintain the original density of "1" and the other pixels have the average nine-pixel density. When the average 121-pixel density is employed, the bottom line maintains the density of "1" and the wide area where white pixels surround the bottom line receives less effects of heat.

In the middle horizontal line shown in FIG. 8B, it is possible for the pixels arranged along the lowest boundary and close to the bottom line to co-operate with the pixels of the bottom line to allow the heat to conduct to the white pixels located between the middle line and the bottom line. Therefore, the average nine-pixel density of 0.7 will be acceptable as the density of the middle horizontal line. But when the density of all the pixels is replaced with the average nine-pixel density value of 0.7, the distensibility of the whole image will be reduced as described above.

As shown in FIG. 8A, since the average 121-pixel densities of all the pixels (bottom line) are not larger than 0.15, the original printing density of "1" is maintained for all the pixels, whereby the distensibility of all the pixels (bottom line) will not be reduced. Further, since the uppermost line is wide as the figure, this uppermost line is possible enough to give thermal effects to the surrounding white area in the similar manner as illustrated in FIG. 4B.

When the density of the whole figure shown in FIG. 7A is replaced with the average nine-pixel density, the densities of the pixels locating at the four corners will excessively decrease, thereby giving a bad influence on the distensibility thereof, as shown in FIG. 7B. When the average 121-pixel densities of the pixels locating at the four corners and the average 121-pixel densities of the pixels held between them are calculated, it is found that they are 0.14 and are not larger than 0.15. Therefore, the original density of "1" is maintained for these pixels, as shown in FIG. 8B.

The above process will be summarized as follows. The original density of the image which has not been converted is denoted by Ci, the density of the image converted or replaced with the average pixel density is denoted by Ri, the average nine-pixel density is given by "$(1/x)\Sigma Ci$", where "x"=9, and "i" is a positive integer equal to or smaller than 9, and the average 121-pixel density is given by "$(1/y)\Sigma Ci$", where "y"=121, and "i" is a positive integer equal to or smaller than 121, and a threshold value "B" of the average 121-pixel density value is set to 0.15. Then, "$(1/n)\Sigma Ci$" represents an average density of n pieces of pixels.

The density of a black printed character of the original image is changed not to heat and distend a white portion. When "$(1/y)\Sigma Ci$"≤B is true, Ri=Ci is set. When "$(1/y)\Sigma Ci$">B is true, Ri="$(1/x)\Sigma Ci$" is set.

In other words, the density of a pixel is replaced with the average pixel density of x pieces of pixels surrounding said pixel. But the density (0%) of a pixel in a white area is not replaced with the average pixel density of the surrounding pixels. If the original density of the pixel is not larger than the previously set threshold value "A", the original density is maintained for the pixel. When the average pixel density value of the "x" pieces of pixels is not larger than the threshold value "A", the original printing density is maintained for the pixel, too. When a calculated average pixel density of y pieces of pixels surrounding a pixel is not larger than the threshold value "B", the original density of said pixel is not replaced with the calculated average pixel density of "y" pieces of pixels.

The above process is summarized by equations. The converted density Ri will be represented as follows.

When "$Ci<A$", "$(1/x)\Sigma Ci<A$", or "$(1/y)\Sigma Ci \leq B$" is true, then $Ri=Ci$ \hfill (1)

where x<y, A>0, and B>0

When "$Ci \geq A$" and "$(1/x)\Sigma Ci \geq A$" and "$(1/y)\Sigma Ci > B$" are true, then $Ri=(1/x)\Sigma Ci$ \hfill (2)

where x<y, A>0, and B>0

In the above example, x=9, y=121, A=0.5, B=0.15 and these numerical values are substituted in the above equations.

Figure 9A:
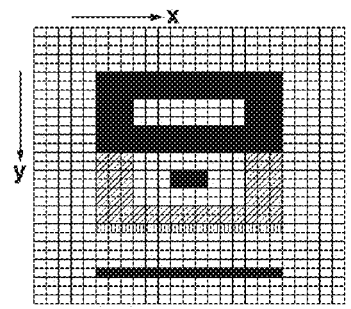
FIG. 9A to FIG. 9G are views illustrating the results of a simulation performed to determine the upper limit value of a proper range of the threshold value "B".

When "$Ci<0.5$", "$(1/9)\Sigma Ci<0.5$", or "$(1/121)\Sigma Ci \leq 0.15$" is true, then $Ri=Ci$ When "$Ci \geq 0.5$" and "$(1/9)\Sigma Ci \geq 0.5$" and "$(1/121)\Sigma Ci > 0.15$" are true, then $Ri=(1/9)\Sigma Ci$ FIG. 9A to FIG. 9G are views illustrating the results of a simulation performed to determine the upper limit value of a proper range of the threshold value "B". FIG. 9A is a view showing the original image, whose density has not been converted. This original image is one image, into which figure-distinctions subjected to experiments are combined for applying simulation on various images.

The figure shown in FIG. 9A consists of the upper half portion of the figure shown in FIG. 5A, whose density is "1", the six pixels locating at the center of the white area also in FIG. 5A, whose density is "1", the lower half portion of the hatched figure shown in FIG. 6A, whose density falls within the range of "$0.15<Ci<0.5$", the horizontally hatched pixels arranged in the bottom portion of the above lower half portion of the hatched figure, whose density falls within the range of "$0<Ci \leq 0.15$", and the bottom line running in the horizontal direction shown in FIG. 7A, whose density is "1".

It is assumed that the coefficients are fixed as follows: x=9, y=121, the threshold value "A" for the average nine-pixel density A=0.5. And then, only the threshold value "B" for the average 121-pixel density is changed from 0.1 to 0.6.

The figure shown in FIG. 9A is scanned vertically (in the main scanning direction indicated by an arrow "x") and then scanned horizontally (in the subsidiary scanning direction indicated by an arrow "y"), thereby obtaining the converted pixel-density Ri of the pixels other than the white pixels (whose density is "0"), which have been calculated based on the equations (1) and (2). The density-converted images are obtained, as shown in FIG. 9B to FIG. 9G. The converted pixel-density Ri of the white pixels is 0 (Ri=0).

FIG. 9B to FIG. 9G are views showing the images whose densities have been converted with the threshold values B set to 0.1, 0.2, 0.3, 0.4, 0.5 and 0.6, respectively.

Figure 9B:
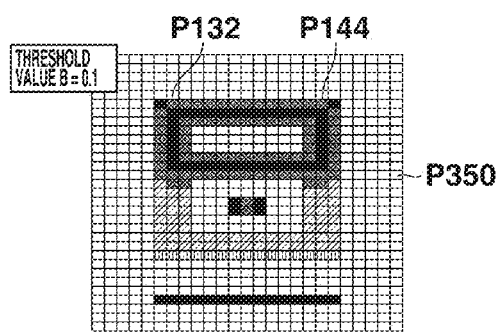
Figure 9C:
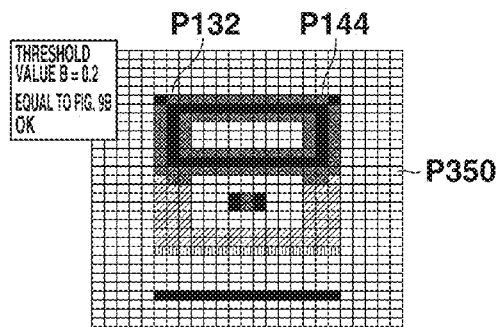
Figure 9D:
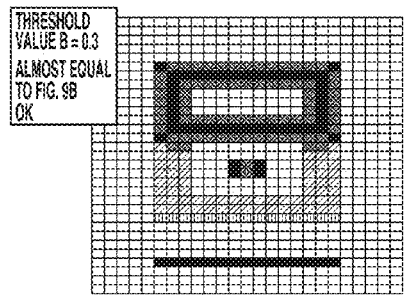
Figure 9E:
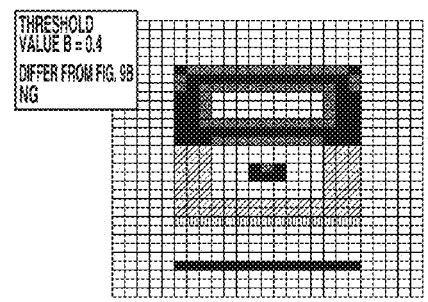
Figure 9F:
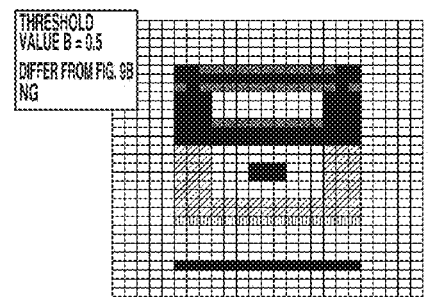
Figure 9G:
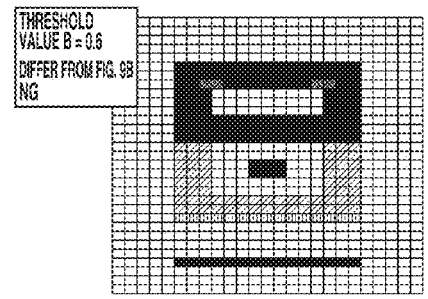
Figure 11A:
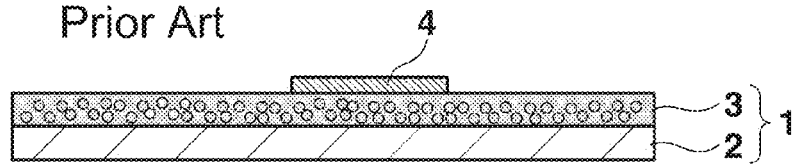
FIG. 11A is a view showing a structure of the thermally distending medium.
Figure 11B:
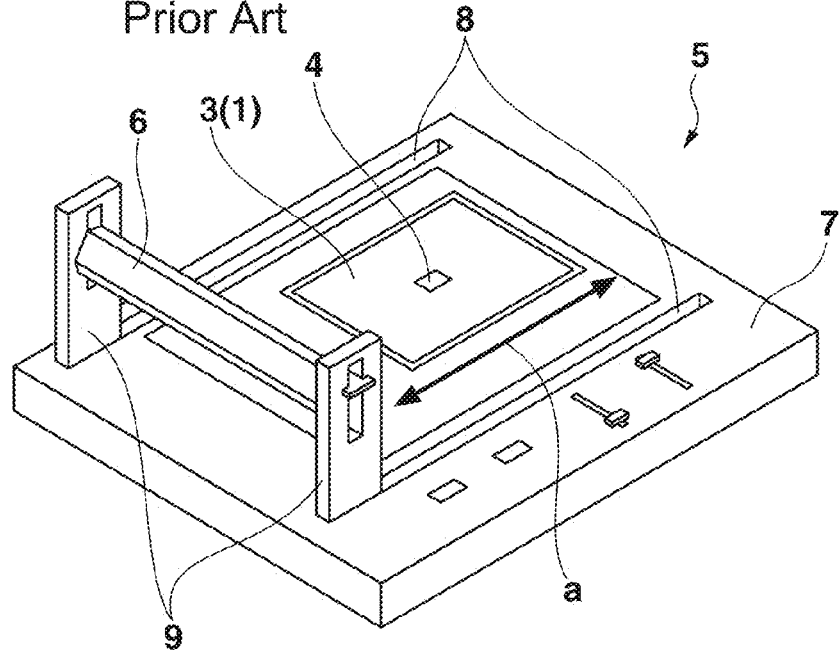
FIG. 11B is a view for explaining the principle of a process for selectively heating a part of the thermally forming medium to make thermal expansion.
Figure 11C:
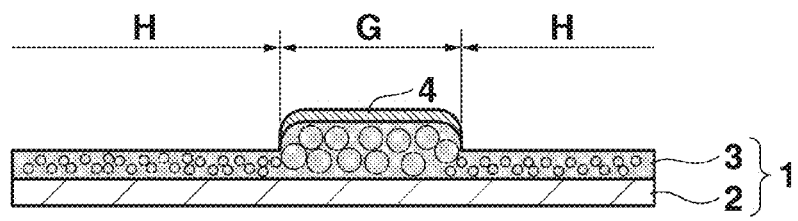
FIG. 11C is a cross sectional view showing the thermally distending medium which has been subjected to the process shown in FIG. 11B.
Figure 12A:
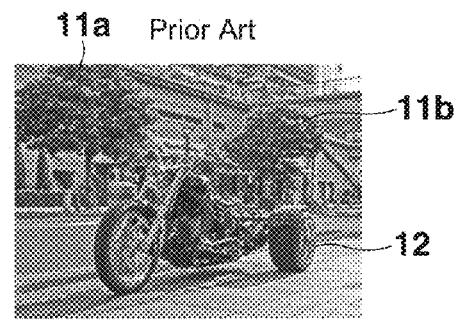
FIG. 12A to FIG. 12G are views for explaining a three-dimensional image printing process performed on the thermally distending medium.
Figure 12E:
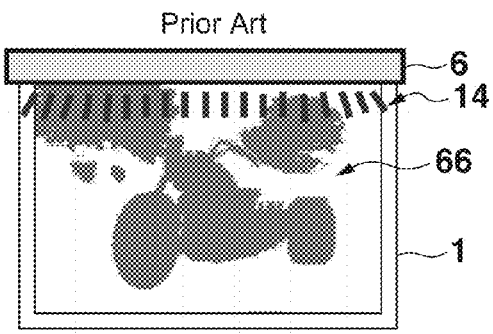
Figure 12B:
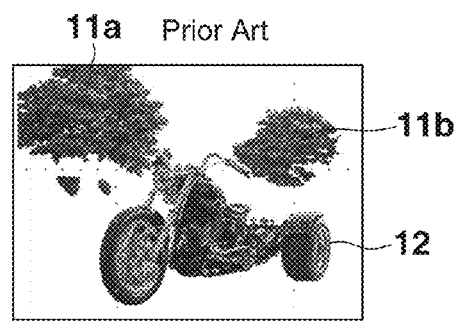
Figure 12F:
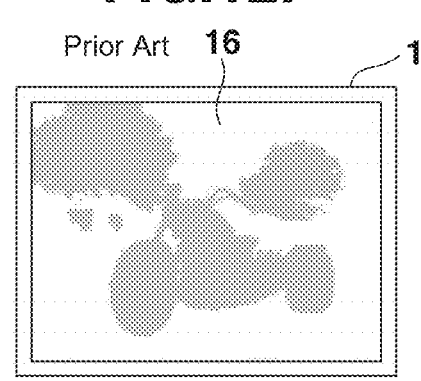
Figure 12C:
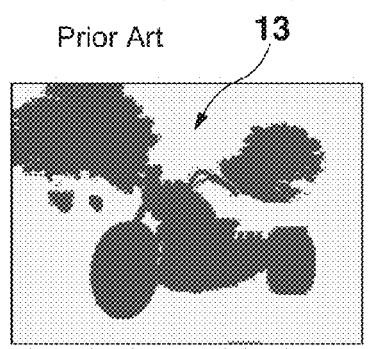
Figure 12G:
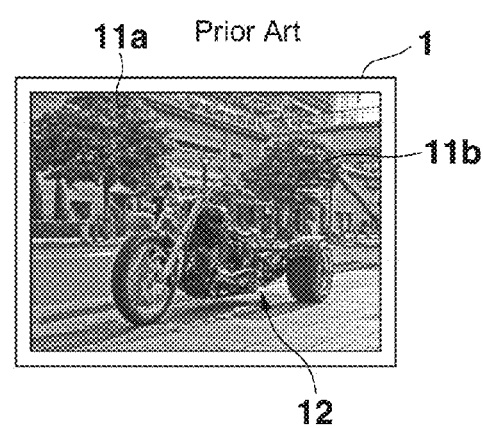
Figure 12D:
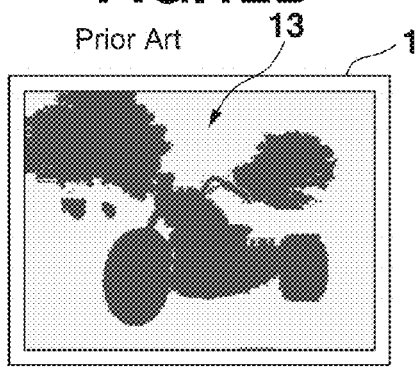

It will be understood at first sight that the density-converted images shown in FIG. 9B to FIG. 9D have the density appropriate for a distended image. Meanwhile, it will be understood at first sight that the density-converted images shown in FIG. 9E to FIG. 9G have not the density appropriate for the distended image, because the portion whose density is to be reduced maintains the original density of "1".

The images appropriate for a distended image, shown in FIG. 9B to FIG. 9D, have the density converted with the threshold value "B" set to 0.1, 0.2 and 0.3, respectively. Therefore, the threshold value "B" will be defined numerically as follows: "$0<B\leq 0.3$". Hereinafter, the threshold value "A" will be referred to as the "first threshold value A", and the threshold value "B" will be referred to as the "second threshold value B".

FIG. 10A is a flow chart of a process for converting the density, expressed by the above equations (1) and (2). FIG. 10B is a view showing an example of the image whose density is to be converted in accordance with the process shown by the flow chart of FIG. 10A. The image shown in FIG. 10B is the same image as shown in FIG. 9A.

When a heat absorbing image is printed on the recording medium (thermally distending sheet) 33 (shown in FIG. 1) with black toner "K", CPU 45 (shown in FIG. 2) receives image data from the external host equipment through the I/F controller 46, and performs a density converting process in accordance with the flow chart of FIG. 10A.

More particularly, CPU 45 expands the plural pixels composing the original image 76 of black toner "K" (heat absorbing agent) over the frame memory 55 of the I/F controller 46, and successively scans each of the expanded pixels (divisions) in the main scanning direction indicated by the arrow "x" and in the subsidiary scanning direction indicated by the arrow "y" (refer to FIG. 10B).

The initial pixel number in the scanning order of the image shown in FIG. 10B is "1". The pixel having the initial pixel number "1" is referred to as "p1". The same applies hereafter. The original image 76 is data consisting of 25 pixels in the horizontal direction by 31 pixels in the vertical direction. Therefore, the pixel "p25" has the pixel number "25", which locates at the right-side end of the first line in the main scanning direction.

In the following description, when the original density set to each of the plural pixels p1, p2, . . . , p775 composing the original image 76 is represented by Ci, the density (hereinafter, referred to as the "additional density of the heat absorbing agent" or the "decided additional density") Ri, at which the heat absorbing agent is printed on the pixel. In the following process, CPU 45 successively replaces the original densities Ci of the pixels p1, p2, . . . , p775 expanded over the frame memory 55 with the decided additional densities Ri, respectively.

At first, CPU 45 sets the pixel number "1" as the initial scanning order to an n-register (step S1 in FIG. 10A). Then, CPU 45 judges whether the original density Ci of the pixel is 0 (0%, the same applies to the following.) (step S2). In the following description, the pixel, which is scanned and/or subjected to judgment is referred to as the "target pixel".

Since the first target pixel having the pixel number 1 is the pixel p1 and its original density is 0, CPU 45 determines that the original density Ci of the pixel p1 is 0 (YES at step S2). CPU 45 advances to step S3, setting 0 to the decided additional density Ri (step S3) and incrementing the n-register by 1 (step S4). Finally, CPU 45 judges whether the incremented number of the n-register has exceeded the pixel number 775 of the final pixel p775 (step S5).

Since the pixel p1 is the first target pixel, CPU 45 determines that the incremented number of the n-register has not exceeded the pixel number 775 (NO at step S5). Then, CPU 45 returns to step S2, and repeatedly performs the processes at step S2, step S3, step S4 and step S5 on the following target pixel.

While the target pixel has the original density of 0, in other words, the pixels, p1 to p131, are subjected to the same processes. When the incremented number of n-register has reached 131 (step S5), CPU 45 returns to step S2. Since the original density Ci of the pixel p131 is not 0 but 1, as shown in FIG. 10B, CPU 45 determines NO at step S2.

Further, CPU 45 judges whether the original density Ci of the target pixel p131 is not smaller than the first threshold value "A" (=0.5) (step S6). Since the original density Ci (=1) of the target pixel p131 is not smaller than the first threshold value "A" (=0.5), CPU 45 determines YES at step S6.

Then, CPU 45 judges whether "$(1/x)\Sigma Ci \geq A$" is true (step S7). In the present example, x=9 and "$(1/x)\Sigma Ci$" represents the average density (average nine-pixel density) of adjacent nine pixels with the target pixel held at their center. The average nine-pixel density of the pixel p131 is calculated and the density of 0.4 is obtained. The pixel 68-1 corresponding to the target pixel 131 is shown by hatching in FIG. 5A.

Since the average nine-pixel density, $(1/x)\Sigma Ci$=0.4, and "$(1/x)\Sigma Ci$" (=0.4) is smaller than the first threshold value "A" (=0.5), CPU 45 determines that "$(1/x)\Sigma Ci$ A" is not true (NO at step S7). Then, CPU 45 advances to step S9, and sets the original density Ci of the target pixel 131 to the decided additional density Ri (step S9).

After performing the process at step S9, CPU 45 performs the process at step SS4, incrementing the n-register by 1 (step S4). CPU 45 determines that the incremented number of the n-register has not exceeded the pixel number 775 of the final pixel p775 (NO at step S5), returning to step S2, again.

With respect to the following target pixel p132, CPU 45 determines that the original density Ci of the pixel p132 is not 0 as shown in FIG. 10B (NO at step S2), and advances to step S6. Further, CPU 45 determines that the original density Ci (=1) of the pixel p132 is not smaller than the first threshold value "A" (=0.5) (YES at step S6). Then, CPU 45 judges whether "$(1/x)\Sigma Ci \geq A$" is true (step S7). The average nine-pixel density of the target pixel p132 is calculated and 0.7 is obtained. The pixel 71-1 corresponding to the target pixel p132 is indicated by double hatching in FIG. 5A.

Since the average nine-pixel density "$(1/x)\Sigma Ci$" is 0.7 and is not smaller than the first threshold value "A" (=0.5), CPU 45 determines YES at step S7. Then, CPU 45 judges whether "$(1/y)\Sigma Ci > B$" is true with respect to the target pixel p132 (step S8).

In the present example, y=121 and "(1/y)ΣCi" represents the average 121-pixel density. The average 121-pixel density of the target pixel p132 will be 30/121 (=0.25). Since the average 121-pixel density "(1/y)ΣCi" (=0.25) is larger than the second threshold value "B" (=0.15), CPU 45 determines YES at step S8.

Then, CPU 45 advances to step S10, and sets "Ri=(1/x)ΣCi". In other words, CPU 45 sets the average nine-pixel density or the original density Ci of the original image to the decided additional density Ri (step S10). As indicated by double hatching in FIG. 9B and FIG. 9C, the average nine-pixel density 6/9=0.66 (about 0.7) is set to the pixel p132.

With respect to the pixels p132 to p144, the average 121-pixel densities, "(1/y)ΣCi", are calculated. That is, "30/121=0.25", "33/121=0.27", "36/121=0.29", "39/121=0.32", "42/121=0.35", "39/121=0.32", "39/121=0.32", "39/121=0.32", and therefore, CPU 45 determines that "(1/y) ΣCi" is larger than the second threshold value "B" with respect to these pixels. Further, the original densities Ci of these pixels are larger than the first threshold value "A", too.

As described above, the processes are repeatedly performed at steps S2, S6, S7, S8, S10, S4 and S5 with respect to the pixels p132 to p144 shown in FIG. 10B. The result of the processes performed on these pixels p132 to p144 is shown in FIG. 5C. The pixels 71-1 corresponding to the pixels p132 to p144 are indicated by double hatching.

When the similar processes have repeatedly been performed on the pixels from p1 to p350 shown in FIG. 10B, (1) to the white pixels whose original density is 0, the decided additional density Ri=0 is set after the process is performed at step S3, and (2) to the pixels whose average nine-pixel density "(1/x)ΣCi" is 1, the original density Ci is set as the decided additional density Ri after the process is performed at step S9 (Refer to FIG. 9B and FIG. 9C).

The pixels like the pixel p356 indicated by slant-hatching in FIG. 10B, whose original density Ci falls within the density range of "0.15<Ci≤0.5", will maintain the original density Ci as the decided additional density Ri after the process is performed at step S9 (Refer to FIG. 9B and FIG. 9C).

In the case where the original density Ci is 0.5, the original density Ci will be maintained and set as the decided additional density Ri after the process is performed at step S9 (Refer to FIG. 9B and FIG. 9C).

The pixels like the pixel p556 indicated by vertical-hatching in FIG. 10B, whose original density Ci falls within the density range of "Ci≤0.15" will maintain the original density Ci as the decided additional density Ri after the process is performed at step S9 (Refer to FIG. 9B and FIG. 9C).

The pixels disposing in a horizontal line, like the pixel p681 of original density Ci of 1, will maintain the original density Ci as the decided additional density Ri after the process is performed at step S9, because their average nine-pixel density "(1/x)ΣCi" will be not larger than 3/9 (=0.33) and is less than the first threshold value "A" (=0.5) (Refer to FIG. 9B and FIG. 9C).

In the present description, terms of "printing characters" or "printing" means addition of a substance having a function as a heat absorbing agent onto the medium. Therefore, a method of adding the substance having a function as a heat absorbing agent includes not only the "printing characters" and "printing" but also other method such as applying black ink. The heat absorbing agent is a substance having a heat absorption factor higher than the factor of the medium.

Although specific embodiments of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications and rearrangements in the following claims and their equivalents.

What is claimed is:

1. A method of setting a density value to each of plural pixels in image data for applying heat absorbing agents on a medium as an image, wherein a first average density value of a first predetermined number of pixels including a target pixel among the plural pixels is calculated and a second average density value of a second predetermined number of pixels including the target pixel among the plural pixels is calculated, the second predetermined number of pixels being larger than the first predetermined number of pixels, the method comprising:

maintaining an initial density value of the target pixel, when the initial density value of the target pixel or the first average density value is not larger than a first prescribed threshold value or when the initial density value of the target pixel or the second average density value is not larger than a second prescribed threshold value, the second prescribed threshold value being smaller than the first prescribed threshold value; and setting the density value of the target pixel to the first average density value, when the initial density value of the target pixel and the first average density value are not smaller than the first prescribed threshold value and when the initial density value of the target pixel and the second average density value are not smaller than the second prescribed threshold value.

2. The method of setting the density value to each of plural pixels in image data according to claim 1, wherein the first predetermined number of pixels consist of 3-by-3 pixels with the target pixel located at a center thereof, and the second predetermined number of pixels consist of 11-by-11 pixels with the target pixel located at a center thereof.

3. The method of setting the density value to each of plural pixels in image data according to claim 1, wherein the first threshold value is a value corresponding to 50% of a value representing a maximum density value.

4. The method of setting the density value to each of plural pixels in image data according to claim 1, wherein the second threshold value is a value which is not larger than 30% of a value representing a maximum density value.

5. A non-transitory computer readable storing medium with an executable program stored thereon, the executable program, when installed on a computer, making the computer set a density value to each of plural pixels in image data for applying heat absorbing agents on a medium as an image, wherein a first average density value of a first predetermined number of pixels including a target pixel among the plural pixels is calculated and a second average density value of a second predetermined number of pixels including the target pixel among the plural pixels is calculated, the second predetermined number of pixels being larger than the first predetermined number of pixels, the executable program causing the computer to perform functions comprising:

maintaining an initial density value of the target pixel, when the initial density value of the target pixel or the first average density value is not larger than a first prescribed threshold value or when the initial density value of the target pixel or the second average density value is not larger than a second prescribed threshold value, the second prescribed threshold value being smaller than the first prescribed threshold value; and setting the density value of the target pixel to the first average density value, when the initial density value of the target pixel and the first average density value are not smaller than the first prescribed threshold value and when the initial density value of the target pixel and the second average density value are not smaller than the second prescribed threshold value.

6. A method of producing a stereoscopic formation by subjecting a medium to thermal expansion, wherein a density value is set to each of plural pixels in image data for applying heat absorbing agents on the medium as an image, and a first average density value of a first predetermined number of pixels including a target pixel among the plural pixels is calculated and a second average density value of a second predetermined number of pixels including the target pixel among the plural pixels is calculated, the second predetermined number of pixels being larger than the first predetermined number of pixels, the method comprising:

maintaining an initial density value of the target pixel, when the initial density value of the target pixel or the first average density value is not larger than a first prescribed threshold value or when the initial density value of the target pixel or the second average density value is not larger than a second prescribed threshold value, the second prescribed threshold value being smaller than the first prescribed threshold value; and setting the density value of the target pixel to the first average density value, when the initial density value of the target pixel and the first average density value are not smaller than the first prescribed threshold value and when the initial density value of the target pixel and the second average density value are not smaller than the second prescribed threshold value.

7. An apparatus for producing a stereoscopic formation by subjecting a medium to thermal expansion, wherein a density value is set to each of plural pixels in image data for applying heat absorbing agents on a medium as an image, and a first average density value of a first predetermined number of pixels including a target pixel among the plural pixels is calculated and a second average density value of a second predetermined number of pixels including the target pixel among the plural pixels is calculated, the second predetermined number of pixels being larger than the first predetermined number of pixels, the apparatus comprising a processor which executes a program stored in a memory to perform operations including:

maintaining an initial density value of the target pixel, when the initial density value of the target pixel or the first average density value is not larger than a first prescribed threshold value or when the initial density value of the target pixel or the second average density value is not larger than a second prescribed threshold value, the second prescribed threshold value being smaller than the first prescribed threshold value; and setting the density value of the target pixel to the first average density value, when the initial density value of the target pixel and the first average density value are not smaller than the first prescribed threshold value and when the initial density value of the target pixel and the second average density value are not smaller than the second prescribed threshold value.

* * * * *